US012417871B2

(12) United States Patent
Lee et al.

(10) Patent No.: US 12,417,871 B2
(45) Date of Patent: Sep. 16, 2025

(54) COIL COMPONENT

(71) Applicant: SAMSUNG ELECTRO-MECHANICS CO., LTD., Suwon-si (KR)

(72) Inventors: Dong Hwan Lee, Suwon-si (KR); Hye Yeon Cha, Suwon-si (KR); Chan Yoon, Suwon-si (KR); Dong Jin Lee, Suwon-si (KR); Hwi Dae Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1116 days.

(21) Appl. No.: 17/360,154

(22) Filed: Jun. 28, 2021

(65) Prior Publication Data

US 2022/0102047 A1 Mar. 31, 2022

(30) Foreign Application Priority Data

Sep. 28, 2020 (KR) ........................ 10-2020-0125602

(51) Int. Cl.
*H01F 27/02* (2006.01)
*H01F 17/04* (2006.01)
(Continued)

(52) U.S. Cl.
CPC ........... *H01F 27/022* (2013.01); *H01F 17/04* (2013.01); *H01F 27/255* (2013.01); *H01F 27/292* (2013.01); *H01F 2017/048* (2013.01)

(58) Field of Classification Search
CPC ...... H01F 27/022; H01F 17/04; H01F 27/255; H01F 27/292; H01F 2017/048
See application file for complete search history.

(56) References Cited

U.S. PATENT DOCUMENTS 11,239,019 B2 * 2/2022 Endo .................. H01F 27/2804
12,020,854 B2 * 6/2024 Ohkubo ................ H01F 27/324
(Continued)

FOREIGN PATENT DOCUMENTS

KR 10-1580399 B1 12/2015
KR 10-2016-0034802 A 3/2016
(Continued)

OTHER PUBLICATIONS

Office Action issued in corresponding Korean Patent Application No. 10-2020-0125602 on Oct. 3, 2024, with English translation.

*Primary Examiner* — Malcolm Barnes
(74) *Attorney, Agent, or Firm* — MORGAN, LEWIS & BOCKIUS LLP

(57) ABSTRACT

A coil component includes a body having an upper surface and a lower surface opposing each other in a thickness direction, a support substrate disposed in the body and having one surface perpendicular to the lower surface of the body, a coil portion disposed on the support substrate, and first and second external electrodes disposed on the lower surface of the body. The body includes an active portion, covering the coil portion, and first and second cover portions, respectively disposed on opposing surfaces of the active portion. The active portion includes a first magnetic metal particle, a second magnetic metal particle having a smaller diameter than the first magnetic metal particle, and a first insulating resin. Each of the first and second cover portions includes a third magnetic metal particle, having a smaller diameter than the first magnetic metal particle, and a second insulating resin.

21 Claims, 7 Drawing Sheets

I-I'

(51) Int. Cl.

| | |
|---|---|
| ***H01F 27/25*** | (2006.01) |
| ***H01F 27/255*** | (2006.01) |
| ***H01F 27/29*** | (2006.01) |

(56) References Cited

U.S. PATENT DOCUMENTS

| | | | | |
|---|---|---|---|---|
| 2015/0371752 | A1* | 12/2015 | Park | H01F 27/255 336/200 |
| 2016/0126004 | A1* | 5/2016 | Yang | H01F 27/292 336/90 |
| 2016/0163444 | A1* | 6/2016 | Choi | H01F 41/043 336/200 |
| 2019/0189338 | A1* | 6/2019 | Kim | H01F 27/29 |
| 2019/0198221 | A1* | 6/2019 | Choi | H01F 27/36 |
| 2020/0090853 | A1* | 3/2020 | Yang | H01F 17/04 |

FOREIGN PATENT DOCUMENTS

| | | | | |
|---|---|---|---|---|
| KR | 10-1607026 | B1 | | 3/2016 |
| KR | 10-2016-0051541 | A | | 5/2016 |
| KR | 20160051541 | A | * | 5/2016 |
| KR | 10-2019-0062342 | A | | 6/2019 |
| KR | 10-2019-0077935 | A | | 7/2019 |
| KR | 10-2020-0031426 | A | | 3/2020 |

* cited by examiner

COIL COMPONENT

CROSS-REFERENCE TO RELATED APPLICATION(S)

The present application claims the benefit of priority to Korean Patent Application No. 10-2020-0125602, filed on Sep. 28, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices, along with a resistor and a capacitor.

As electronic devices gradually gain higher performance and become smaller, the number of electronic components used in electronic devices is increased, while being miniaturized.

In the case of a thin film type coil component, a body is formed by laminating a magnetic composite sheet, in which magnetic metal particles are dispersed in an insulating resin, on a substrate on which a coil portion is formed through a plating process, and curing the laminated magnetic composite sheet, and an external electrode is formed on a surface of the body.

SUMMARY

An aspect of the present disclosure is to provide a coil component, in which a coil portion is disposed to be perpendicular to a lower surface of a body, capable of readily preventing short-circuits between external electrodes.

Another aspect of the present disclosure is to provide a coil component, in which a coil portion is disposed to be perpendicular to a lower surface of a body, capable of increasing an effective volume of a magnetic material.

According to an aspect of the present disclosure, a coil component includes a body having an upper surface and a lower surface opposing each other in a thickness direction of the body, a support substrate disposed in the body and having one surface perpendicular to the lower surface of the body, a coil portion disposed on at least one surface of the support substrate, and a first external electrode and a second external electrode disposed on the lower surface of the body to be spaced apart from each other and respectively connected to the coil portion. The body includes an active portion, covering the coil portion, and first and second cover portions, respectively disposed on an upper surface and a lower surface of the active portion opposing each other in the thickness direction. The active portion includes a first magnetic metal particle, a second magnetic metal particle having a smaller diameter than the first magnetic metal particle, and a first insulating resin. Each of the first and second cover portions includes a third magnetic metal particle, having a smaller diameter than the first magnetic metal particle, and a second insulating resin.

According to an aspect of the present disclosure, a coil component includes a body having a lower surface; a support substrate disposed in the body and having one surface perpendicular to the lower surface of the body; and a coil portion dispose on at least one surface of the support substrate. The body includes an active portion, covering the coil portion, and first to fourth cover portions, respectively disposed on an upper surface of the body, the lower surface of the body, one side surface of the body, and the other side surface of the body. Each of the active portion and the first to fourth cover portions includes magnetic metal particles and an insulating resin. A filling rate of the magnetic metal particles of the active portion is greater than a filling rate of the magnetic metal particles of each of the first to fourth cover portions.

According to an aspect of the present disclosure, a coil component includes a body having an upper surface and a lower surface opposing each other; a coil portion disposed in the body vertically with respect to the lower surface of the body; and a first external electrode and a second external electrode respectively including pad portions disposed on the lower surface of the body to be spaced apart from each other and connected to the coil portion. An average size of metal particles dispersed in a portion, in contact with one of the pad portions, of the body, is less than an average size of metal particles dispersed in another portion, spaced apart from outer surfaces of the body, of the body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
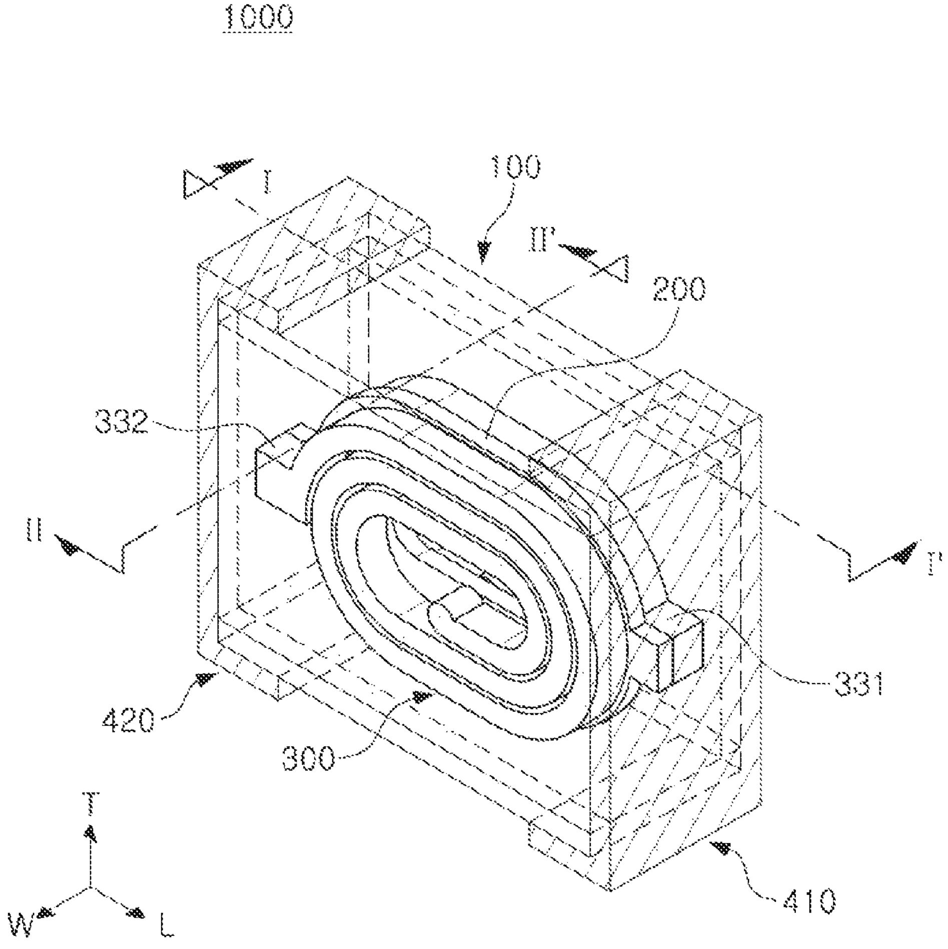
FIG. 1 is a schematic perspective view of a coil component according to an exemplary embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a direction of gravity.

Terms such as “coupled to,” “combined to,” and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
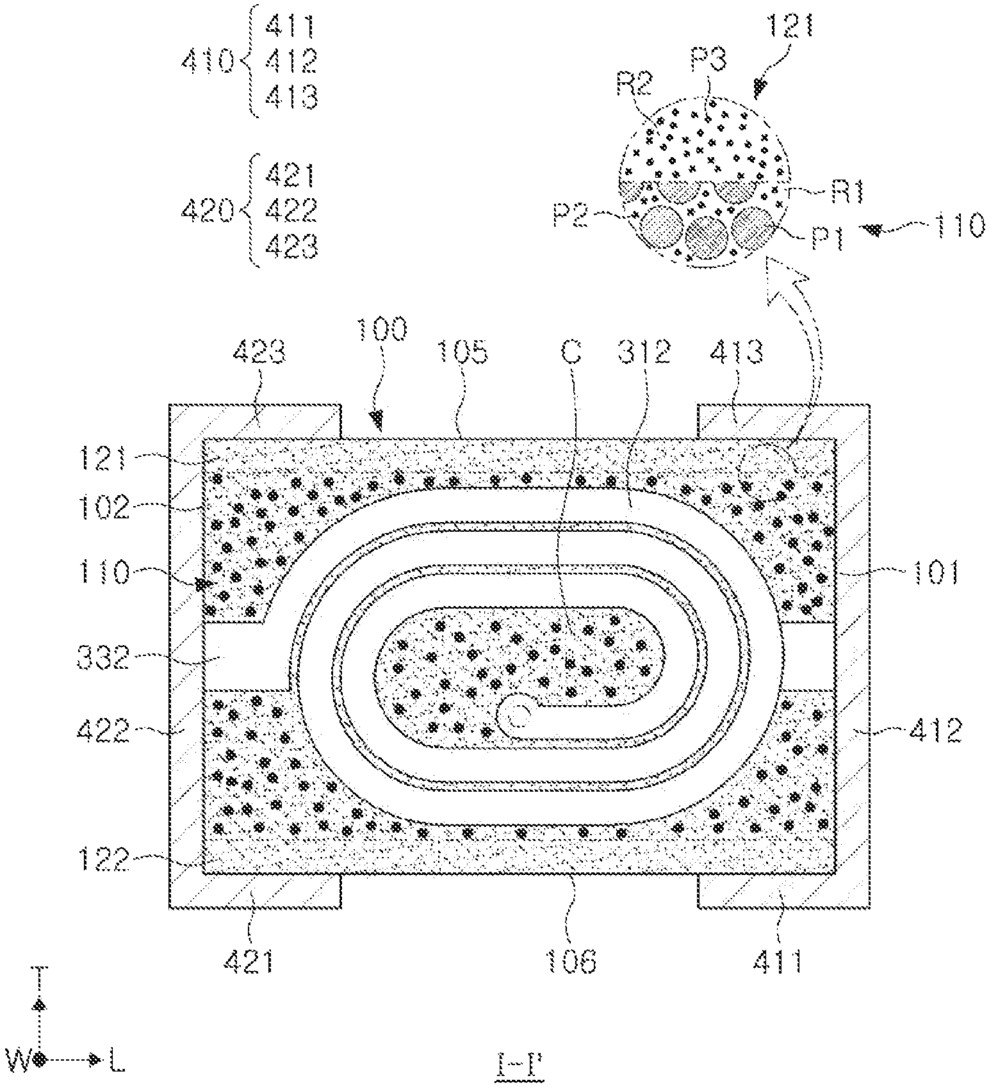
FIG. 2 is a cross-sectional view taken along line I-I' of FIG. 1.
Figure 3:
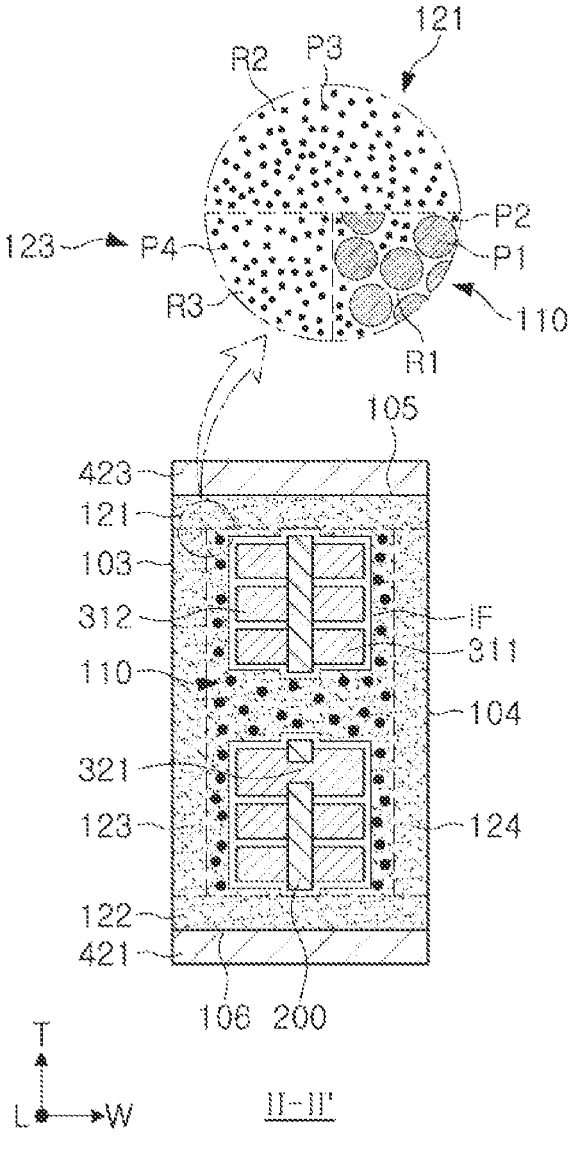
FIG. 3 is a cross-sectional view taken along line II-II' of FIG. 1.

FIG. 1 is a schematic perspective view of a coil component according to an exemplary embodiment. FIG. 2 is a cross-sectional view taken along line I-I' of FIG. 1, and FIG. 3 is a cross-sectional view taken along line II-II' of FIG. 1. For ease of description, in FIG. 2, an internal structure of the coil component is illustrated based on the cross-section taken along line I-I' of FIG. 1.

Referring to FIGS. 1 to 3, a coil component 1000 according to an exemplary embodiment may include a body 100, a support substrate 200, a coil portion 300, and external electrodes 410 and 420. The body 100 may include an active portion C and first to fourth cover portions 121, 122, 123 and 124.

The body 100 may form an exterior of the coil component 1000 according to the present embodiment, and may have the support substrate 200 and the coil portion 300 embedded therein.

The body 100 may be formed to have an overall hexahedral shape.

Based on FIGS. 1 to 3, the body 100 has a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 105 and the sixth surface 106 of the body 100. Hereinafter, both end surfaces of the body 100 may refer to the first surface 101 and the second surface 102 of the body 100, respectively, and both side surfaces of the body 100 may refer to the third surface 103 and the fourth surface 104 of the body 100, respectively. In addition, a lower surface and an upper surface of the body 100 may refer to the sixth surface 106 and the fifth surface 105, respectively.

The body 100 may be formed such that the coil component 1000, including the external electrodes 410 and 420 to be described later, has a length of 1.0 mm, a width of 0.5 mm, and a thickness of 0.6 mm or a length of 1.6 mm, a width of 0.8 mm, and a thickness of 1.0 mm, but is not limited thereto. Since the above-described sizes of the coil component 1000 are merely illustrative, cases in which a size of the coil component 1000 are smaller or larger than the above-mentioned dimensions may be not excluded from the scope of the present disclosure.

The above-described length of the coil component 1000 may refer to a maximum value, among lengths of a plurality of segments, connecting outermost boundary lines of the body 100, among outermost boundary lines of the coil component 1000 illustrated in a cross-sectional image, and parallel to a length (L) direction of the body 100, based on an optical microscope or scanning electron microscope (SEM) image for a cross-section of the body 100 in a length-thickness (L-T) direction in a central portion of the body 100 in a width (W) direction. Alternatively, the length of the coil component may refer to arithmetic means of lengths of at least three segments, among a plurality of segments connecting outermost boundary lines of the coil component 1000 illustrated in the cross-sectional image, and parallel to the length (L) direction of the body 100.

The above-described thickness of the coil component 1000 may refer to a maximum value, among thicknesses of a plurality of segments, connecting outermost boundary lines of the body 100, among outermost boundary lines of the coil component 1000 illustrated in a cross-sectional image, and parallel to a thickness (T) direction of the body 100, based on an optical microscope or scanning electron microscope (SEM) image for a cross-section of the body 100 in a length-thickness (L-T) direction in a central portion of the body 100 in a width (W) direction. Alternatively, the thickness of the coil component may refer to arithmetic means of thicknesses of at least three segments, among a plurality of segments connecting outermost boundary lines of the coil component 1000 illustrated in the cross-sectional image, and parallel to the thickness (T) direction of the body 100.

The above-described width of the coil component 1000 may refer to a maximum value, among widths of a plurality of segments, connecting outermost boundary lines of the body 100, among outermost boundary lines of the coil component 1000 illustrated in a cross-sectional image, and parallel to a width (W) direction of the body 100, based on an optical microscope or scanning electron microscope (SEM) image for a cross-section of the body 100 in a width-thickness (W-T) direction in a central portion of the body 100 in a length (L) direction. Alternatively, the width of the coil component may refer to arithmetic means of widths of at least three segments, among a plurality of segments connecting outermost boundary lines of the coil component 1000 illustrated in the cross-sectional image, and parallel to the width (W) direction of the body 100.

Alternatively, each of the length, the width, and the thickness of the coil component 1000 may be measured by a micrometer measurement method. In the micrometer measurement method, measurement may be performed by setting a zero point using a micrometer (instrument) with gauge repeatability and reproducibility (R&R), inserting the coil component 1000 between tips of the micrometer, and turning a measurement lever of the micrometer. When the length of the coil component 1000 is measured by a micrometer measurement method, the length of the coil component 1000 may refer to a value measured once or an arithmetic mean of values measured two or more times. This may be equivalently applied to the width and the thickness of the coil component 1000.

The body 100 may include magnetic metal particles (or metal powder particles) P1, P2, P3, and P4 and insulating resins R1, R2, and R3. The body 100 is formed by laminating one or more magnetic composite sheets including insulating resins R1, R2, and R3 and magnetic metal particles P1, P2, P3, and P4 dispersed in the insulating resins R1, R2, and R3.

The body 100 includes an active portion 110 and cover portions 121, 122, 123, and 124.

Specifically, the active portion 110 may cover the coil portion 300 to be described later, and may include a first magnetic metal particle P1, a second magnetic metal particle P2 having a smaller diameter than the first magnetic metal particle P1, and a first insulating resin R1. The first cover portion 121 may be disposed on an upper surface of the active portion 110 and may include a third magnetic metal particle P3, having a smaller diameter than the first magnetic metal particle P1, and a second insulating resin R2. The second cover portion 122 may be disposed on a lower surface of the active portion 110 and may include a third magnetic metal particle P3, having a smaller diameter than the first magnetic metal particle P1, and a second insulating resin R2. The third and fourth cover portions 123 and 124 may be disposed on side surfaces of the active portion 110 facing each other in a width direction, respectively. Each of the third and fourth cover portions 123 and 124 may include a fourth magnetic metal particle P4, having a smaller diameter particle than the first magnetic metal particle P1, and a third insulating resin R3. In the present specification, a diameter (or a size) or an average diameter (or an average size) of a magnetic metal particle may refer to a particle size distribution represented by D50 or D90, measured, for example, based on an optical microscope or scanning electron microscope (SEM) image of a cross-section of the body 100. Other methods and/or tools appreciated by one of ordinary skill in the art, even if not described in the present disclosure, may also be used.

The active portion 110 may be formed by laminating a first magnetic composite sheet, including the first and second magnetic metal powder particles P1 and P2 and the first insulating resin R1, on one surface and the other surface of the support substrate 200 to be described later in the width direction W. Since the active portion 110 includes the first magnetic metal powder particle P1 having a relatively large diameter and the second magnetic metal powder particle P2 having a relatively small particle size, the active portion 110 may have a relatively high filling rate of the magnetic metal powder particles P1 and P2, as compared with the first to fourth cover portions 121, 122, 123, and 124 including only the third and fourth magnetic metal powder particles P3 and P4 having a relatively small grain size, as compared with the first magnetic metal powder P1. The term "filling rate of a magnetic metal powder" may refer to an overall volume or an overall mass occupied by a magnetic metal powder particle within a unit volume (for example, a unit volume of a length of 10 μm * a width of 10 μm * a thickness of 10 μm) of each of the active portion 110 and the cover portions 121, 122, 123, and 124. Hereinafter, for ease of description, a description will be provided under the assumption that the magnetic metal powders P1 and P2 of the active portion 110 include only the first magnetic metal powder particle P1 and the second magnetic metal powder particle P2 having different particle sizes, but the present disclosure is not limited thereto. For example, as another non-limiting example of the present disclosure, the magnetic metal powder particles P1, P2, and P3 of the active portion 110 may include three types of powder particles having different diameters.

The first and second cover portions 121 and 122 may be disposed on upper and lower surfaces of the active portion 110 facing each other in the thickness direction T, respectively. In general, a plurality of individual components may be formed in a batch by manufacturing a coil bar, in which a plurality of bodies are connected to each other, and then separating the plurality of bodies from each other through a dicing process. In the case of a horizontally disposed component in which one surface of a support substrate is disposed to be parallel to a mounting surface of the component, a dicing surface does not constitute the upper and lower surfaces of the body in an individual component. On the other hand, in the case of a vertically disposed component in which one surface of a support substrate is disposed to be perpendicular to amounting surface, upper and lower surfaces of the body correspond to cut surfaces formed by dicing. For this reason, at least a portion of a magnetic metal powder particle included in the body may be cut by a dicing blade to be exposed to the upper and lower surfaces of the body. When an external electrode is formed by plating in such a state, a magnetic metal powder particle cut to expose a conductive core may cause plating spreading to occur on the upper surface and the lower surface of the body, resulting in short-circuits of the external electrode. In the present embodiment, the above-described issue may be addressed by providing the first and second cover portions 121 and 122 on the upper and lower surfaces of the active portion 110, i.e., dicing surfaces. For example, in the case of the present embodiment, at least a portion of the first and second magnetic metal powder particles P1 and P2 may be cut, and thus, cut surfaces may be exposed to the upper and lower surfaces of the active portion 110 (in particular, the magnetic metal powder particle P1 having a relatively large grain size is often cut to be exposed). A first cover portion 121 and a second cover portions 122, including a third magnetic metal powder particle P3 and a second insulating resin R2, may be disposed on the upper and lower surfaces of the active portion 110, respectively, to cover the conductive core of the magnetic metal powder particle exposed to the upper and lower surfaces of the active portion 110. For example, the first and second cover portions 121 and 122 may cover the upper and lower surfaces of the active portion 110, i.e., cut surfaces of the active portion 110. For this reason, the conductive cores of the magnetic metal powder particles P1, P2, and P3 may not be exposed to the upper and lower surfaces of the body 100. Accordingly, plating spreading, occurring on the upper and lower surfaces of the body 100 when plating the external electrodes 410 and 420, may be reduced. Since the first and second cover portions 121 and 122 include a third magnetic metal powder particle P3 having a diameter smaller than the first magnetic metal powder particle P1, surface roughness of the surface of the first and second cover portions 121 and 122 may be reduced. Pad portions 411 and 421 and band portions 413 and 423 of the external electrodes 410 and 420 to be described later may be disposed on the upper and lower surfaces of the body 100, and an exterior defect of the external electrodes 410 and 420 may be reduced due to relatively low surface roughness of the upper and lower surfaces of the body 100. In addition, the pad portions 411 and 421 and the band portions 413 and 423 of the external electrode may be formed to be uniform. The diameters of the third magnetic metal powder particle P3 and the diameter of the second magnetic metal powder particle P2 may be the same. In this case, ease of process may be increased. The second insulating resin R2 may be different from the first insulating resin R1. However, the present disclosure is not limited thereto and the first and second insulating resins R1 and R2 may include, for example, the same resin such as an epoxy resin, whereby bonding force between the active portion 110 and the first and second cover portions 121 and 122 may be improved. Since curing of the active portion 110 has been finished when the first and second cover portions 121 and 122 were formed, an interface may be formed between each of the first and second cover portions 121 and 122 and the active portion 110. The first and second cover portions 121 and 122 may be formed by a sheet lamination method or a paste applying method, but the present disclosure is not limited thereto.

The third and fourth cover portions 123 and 124 may be disposed on both surfaces of the active portion 110 facing in the width direction T, respectively. For example, based on the direction of FIG. 1, the third cover portion 123 may be disposed on a front surface of the active portion 110 to form the third surface 103 of the body 100, and the fourth cover portion 124 may be disposed on a rear surface of the active portion 110 to form the fourth surface 104 of the body 100. The third and fourth cover portions 123 and 124 may be formed in a process of laminating the first magnetic composite sheet for forming the active portion 110 by providing a second magnetic composite sheet, including a fourth magnetic metal powder particle P4 having a smaller diameter than the first magnetic metal powder particle P1 and a third insulating layer R3, on the first magnetic composite sheet disposed an outermost side of the width direction W and then laminating the first and second magnetic composite sheets. For example, unlike the first and second cover portions 121 and 122, the third and fourth cover portions 123 and 124 may be formed together in the same process as the active portion 110. Since the first and second cover portions 121 and 122 form the third and fourth surfaces 103 and 104 of the body 100, an exterior defect of the body 100 may be reduced. A diameter of the fourth magnetic metal powder particle P4 may be the same as a diameter of the third magnetic metal powder particle P3 or the diameter of the second magnetic metal powder particle P2. The third insulating resin R3 may include the same resin as the first insulating resin R1, but the present disclosure is not limited thereto. For the above-described reasons of process, the upper surface of the active portion 110 and the upper surface of each of the third and fourth cover portions 123 and 124 may be coplanar with each other, and the lower surface of the active portion 110 and the lower surface of each of the third and fourth cover portions 123 and 124 may be coplanar with each other. In addition, for the above-described reasons of process, at least a portion of each of the upper and lower surfaces of the third and fourth cover portions 123 and 124, coplanar with each of the upper and lower surfaces of the active portion 110, may be covered.

Each of the first to fourth cover portions 121, 122, 123, and 124 may have a thickness of 20 μm to 30 μm. The thickness of the first and second cover portions 121 and 122 may refer to a length (dimension) of the first and second cover portions 121 and 122 in the thickness direction T, and the thickness of the third and fourth cover portions 123 and 124 may refer to a length (dimension) of the third and fourth cover portions 123 and 124 in the width direction W. For example, when the thickness of the first cover portion 121 is less than 20 μm, it may difficult to secure insulation between the external electrodes 410 and 420, and there is a probability that short-circuits may occur between the external electrodes 410 and 420. For example, when the thickness of the first cover portion 121 is greater than 30 μm, the thickness of the entire component may be increased.

Each of the magnetic metal particles P1, P2, P3, and P4 may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal particle may be at least one or more of a pure iron particle, a Fe—Si-based alloy particle, a Fe—Si—Al-based alloy particle, a Fe—Ni-based alloy particle, a Fe—Ni—Mo-based alloy particle, a Fe—Ni—Mo—Cu-based alloy particle, a Fe—Co-based alloy particle, a Fe—Ni—Co-based alloy particle, a Fe—Cr-based alloy particle, a Fe—Cr—Si-based alloy particle, a Fe—Si—Cu—Nb-based alloy particle, a Fe—Ni—Cr-based alloy particle, and a Fe—Cr—Al-based alloy particle.

The magnetic metal particles P1, P2, P3, and P4 may be amorphous or crystalline. For example, the magnetic metal particles P1, P2, P3, and P4 may be a Fe—Si—B—Cr-based amorphous alloy particle, but is not limited thereto. Each of the magnetic metal particles P1, P2, P3, and P4 may have an average diameter of about 0.1 μm to 30 μm, but is not limited thereto.

In each of the magnetic metal particles P1, P2, P3, and P4, a conductive core, the above-described material, and an insulating coating layer, coating a surface of the core, may be disposed.

Each of the insulating resins R1, R2, and R3 may include epoxy, polyimide, liquid crystal polymer, or the like, in a single or combined form, but is not limited thereto.

The body 100 may have a core C penetrating through the support substrate 200 and the coil portion 300 to be described later. The core C may be formed by filling a through-hole of the coil portion 300 with a magnetic composite sheet, but the present disclosure is not limited thereto.

The support substrate 200 may be disposed within the body 100, and may have one surface perpendicular to the lower surface 106 of the body 100. The support substrate 200 may be configured to support the coil portion 300 to be described later. The sentence "one surface of the support substrate 200 is perpendicular to the lower surface 106 of the body 100" may mean that, as an example, one surface of the support substrate 200 and the lower surface 106 of the body 100 form an angle of 80 to 100 degrees, while including meaning of perpendicularity in mathematical sense. Element A such as an object, a plane, or a line/direction being perpendicular to or vertical to element B such as another object, another plane, or another line/direction may mean that, as an example, element A and element B form an angle of 80 to 100 degrees, while including meaning of perpendicularity in mathematical sense. In one example, a winding axis of the coil portion 300 may be parallel to the lower surface 106 of the body 100. The sentence "a winding axis of the coil portion 300 may be parallel to the lower surface 106 of the body 100" may mean that, as an example, a winding axis and the lower surface 106 of the body 100 form an angle of −10 to 10 degrees, while including meaning of parallel in mathematical sense. Element C such as an object, a plane, or a line/direction being parallel to element D such as another object, another plane, or another line/direction may mean that, as an example, element C and element D form an angle of −10 to 10 degrees, while including meaning of parallel in mathematical sense.

The support substrate 200 may include an insulating material, for example, a thermosetting insulating resin such as an epoxy resin, a thermoplastic insulating resin such as polyimide, or a photosensitive insulating resin, or the support substrate 200 may include an insulating material in which a reinforcing material such as a glass fiber or an inorganic filler is impregnated with an insulating resin. For example, the support substrate 200 may include an insulating material such as prepreg, Ajinomoto Build-up Film (ABF), FR-4, a bismaleimide triazine (BT) film, a photo-imageable dielectric (PID) film, a copper clad laminate (CCL), or the like, but the present disclosure is not limited thereto.

The inorganic filler may be at least one or more selected from the group consisting of silica ($SiO_2$), alumina ($Al_2O_3$), silicon carbide (SiC), barium sulfate ($BaSO_4$), talc, mud, a mica particle, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support substrate 200 is formed of an insulating material including a reinforcing material, the support substrate 200 may provide more improved rigidity. When the support substrate 200 is formed of an insulating material including no glass fiber, the support substrate 200 is advantageous for thinning the coil component 1000. In addition, the effective volume of the coil portion 300 and/or the magnetic material may be increased, based on a component having the same volume, to improve component characteristics. When the support substrate 200 is formed of an insulating material including a photosensitive insulating resin, the number of processes for forming the coil portion 300 may be decreased. Therefore, it may be advantageous in reducing production costs, and a fine via may be formed.

The coil portion 300 may be disposed on at least one surface of the support substrate 200. The coil portion 300 may be embedded in the body 100 to express characteristics of the coil component 1000. For example, when the coil component 1000 is used as a power inductor, the coil portion 300 may store an electric field as a magnetic field to maintain an output voltage, serving to stabilize power of an electronic device.

The coil portion 300 may be formed on at least one of both surfaces of the support substrate 200 facing each other, and may form at least one turn. The coil portion 300 may be disposed on one surface and the other surface of the support substrate 200 of the body 100 facing each other in the width direction W.

The coil portion 300 may include coil patterns 311 and 312, a via 321, and lead-out patterns 331 and 332. Specifically, each of the first coil pattern 311 and the second coil pattern 312 may be in the form of a planar spiral in which at least one turn is formed around the core 110. For example, based on the direction of FIG. 1, the first coil pattern 311 may form at least one turn around the core 110 on the rear surface of the support substrate 200. The second coil pattern 312 may form at least one turn around the core C on the front surface of the support substrate 200. The first lead-out pattern 331 may be disposed on the rear surface of the support substrate 200 to be connected to the first coil pattern 311 and to be exposed to the first surface 101 of the body 100. The second lead-out pattern 332 may disposed on the front surface of the support substrate 200 to be connected to the second coil pattern 312 and to be exposed to the second surface 102 of the body 100. The via 321 may penetrate through the support substrate 200 to connect innermost end portions of the first and second coil patterns 311 and 312 to each other. Thus, the coil portion 300 may function as a single coil connected overall.

At least one of the coil patterns 311 and 312, the vias 321, and the lead-out patterns 331 and 332 may include at least one conductive layer.

As an example, when the second coil pattern 312, the via 321, and the second lead-out pattern 332 are formed on the front surface of the support substrate 200 by plating, each of the second coil pattern 312, the via 321, and the second lead-out pattern 332 may include a seed layer and an electroplating layer. The seed layer may be formed by electroless plating or vapor deposition such as sputtering. Each of the seed layer and the electroplating layer may have a single-layer structure or a multilayer structure. An electroplating layer having a multilayer structure may be formed to have a conformal film structure in which one electroplating layer is covered with another electroplating layer, or another electroplating layer is laminated on only one surface of one electroplating layer. It may be formed in a shape. The seed layer of the second coil pattern 312, the seed layer of the via 321, and the seed layer of the second lead-out pattern 332 may be formed to be integrated with each other, such that a boundary may not be formed therebetween, but the present disclosure is not limited thereto. The electroplating layer of the second coil pattern 312, the electroplating layer of the via 321, and the electroplating layer of the second lead-out pattern 332 may be formed to be integrated with each other, such that a boundary may not be formed therebetween, but the present disclosure is not limited thereto.

Each of the coil patterns 311 and 312, the via 321, and the lead-out patterns 331 and 332 may include a conductive material such as copper (Cu), aluminum (Al), silver (Ag), tin (Sn), gold (Au), nickel A conductive material such as (Ni), lead (Pb), titanium (Ti), chromium (Cr), molybdenum (Mo), or alloys thereof, but the present disclosure is not limited thereto.

In the present embodiment, since the coil portion 300 is disposed to be perpendicular to the sixth surface 106 of the body 100, a mounting surface, a mounting area may be reduced while maintaining the volume of the body 100. Therefore, a larger number of electronic components may be mounted on a mounting board having the same area. In addition, since the coil portion 300 is disposed to be perpendicular to the sixth surface 106 of the body 100, the mounting surface, a direction of magnetic flux induced by the coil portion 300 may be disposed to be parallel to the sixth surface 106 of the body 100. For this reason, noise induced to the mounting surface of the mounting board may be relatively reduced.

An insulating layer IF may be provided to insulate the coil portion 300 from the body 100, and may include a known insulating material such as parylene, but the present disclosure is not limited thereto. The insulating layer IF may be formed by vapor deposition. However, the present disclosure is not limited thereto, and the insulating layer IF may be formed by laminating an insulating film on both surfaces of the support substrate 200.

The external electrodes 410 and 420 may electrically connect the coil component 1000 according to the present embodiment to a printed circuit board (PCB), or the like, when the coil component 1000 is mounted on the PCB, or the like. As an example, the coil component 1000 may be mounted such that the sixth surface 106 of the body 100 faces an upper surface of the PCB, and the external electrodes 410 and 420, disposed on the sixth surface 106 of the body 100 to be spaced apart from each other, and a connection portion of the PCB may be electrically connected to each other.

The external electrodes 410 and 420 may be connected to the lead-out patterns 331 and 332, disposed on the sixth surface 106 of the body 100 to be spaced apart from each other, respectively. Specifically, the first external electrode 410 may include a first pad portion 411 disposed on the sixth surface 106 of the body 100, a first extension portion 412 extending from the first pad portion 411 to the first surface 101 of the body 100, and a first band portion 413 extending from the first extension portion 412 to the fifth surface 105 of the body 100. The first extension portion 412 may be in contact with and connected to the first lead-out pattern 331 exposed to the first surface 101 of the body 100. The second external electrode 420 may include a second pad portion 421 disposed on the sixth surface 106 of the body 100, a second extension portion 422 extending from the second pad portion 421 onto the second surface 102 of the body 100, and a second band portion 423 extending from the second extension portion 422 onto the fifth surface 105 of the body 100. The second extension portion 422 may be in contact with and connected to the second lead-out pattern 332 exposed to the second surface 102 of the body 100. For example, each of the first and second external electrodes 410 and 411 may be formed to have an overall ⊏-shape. For example, each of the pad portions 411 and 421 and the band portions 413 and 423 may have a thickness of 20 μm, and each of the extension portions 412 and 422 may have a thickness of 30 μm, but the present disclosure is limited thereto. The phrase "thickness of each of the pad portions 411 and 421 and the band portions 413 and 423" may refer to a length (dimension) of each of the pad portions 411 and 421 and the band portions 413 and 423 in the thickness direction T. The phrase "thickness of each of the extension portions 412 and 422" may refer to a length (dimension) of each of the extension portions 412 and 422 in the width direction W.

The external electrodes 410 and 420 may be formed of a conductive material such as copper (Cu), aluminum (Al), silver (Ag), tin (Sn), gold (Au), nickel (Ni), lead (Pb), chromium (Cr), titanium (Ti), or alloys thereof, but the present disclosure is not limited thereto.

Each of the external electrodes 410 and 420 may be formed to have a multilayer structure. For example, each of the external electrodes 410 and 420 may include a first metal layer disposed on the body 100, a second metal layer disposed on the first metal layer, and a third metal layer disposed on the second metal layer. The first metal layer may be formed by vapor deposition such as sputtering, electroplating, or a paste applying method. The paste applying method means that a conductive paste, including a conductive particle such as copper (Cu) and/or silver (Ag) and a thermosetting resin, is applied to the surface of the body 100 and is then cured. Each of the second and third metal layers may be formed by electroplating. As a non-limiting example, the first metal layer may be a copper plating layer, the second metal layer may be a nickel plating layer, and the third metal layer may be a tin plating layer, but the present disclosure is not limited thereto.

Accordingly, the coil component 1000 according to the present embodiment may prevent plating spreading on the upper and lower surfaces of the body 100 to prevent short-circuits between the external electrodes 410 and 420 when the external electrodes 410 and 420 are plated. In addition, the first cover layer 121 may be additionally provided on the upper surface of the active portion 110 while significantly reducing a distance between the upper surface of the active portion 110 and the coil portion 300 to reduce an overall thickness of the component, so that a margin of the component in the thickness direction T may be secured.

Figure 4:
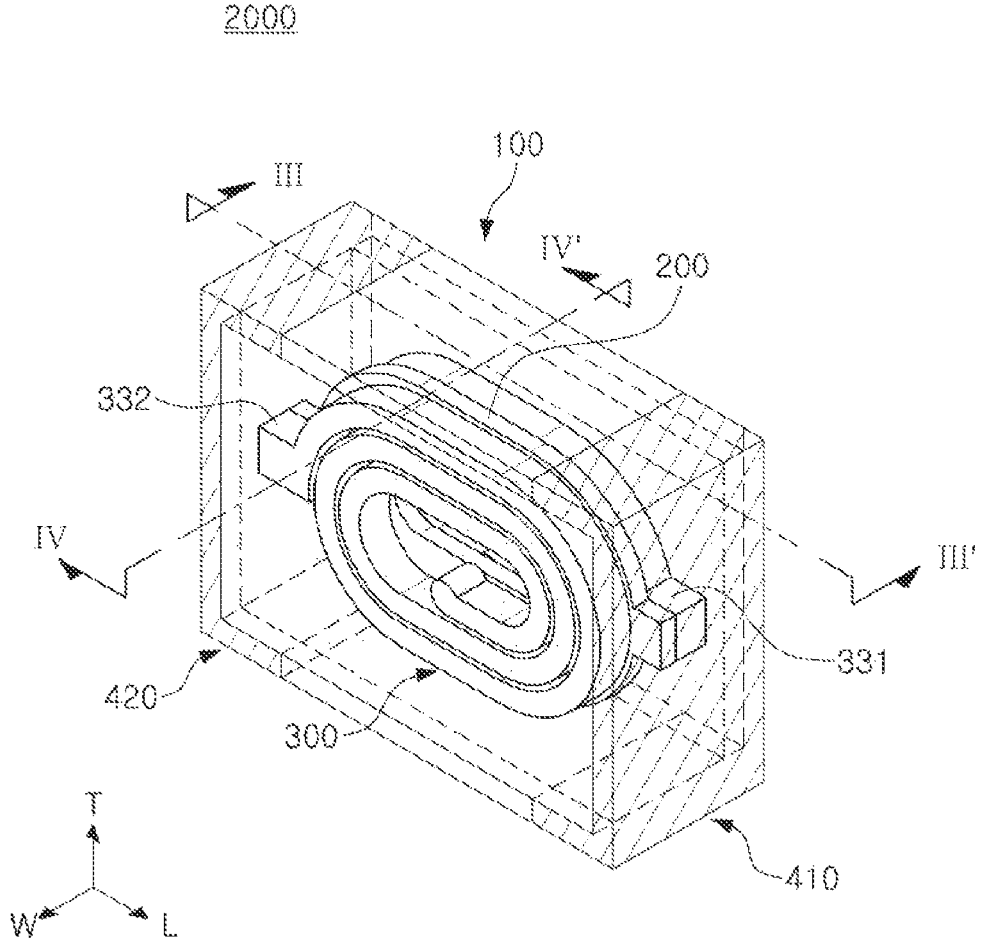
FIG. 4 is a schematic perspective view of another coil component according to an exemplary embodiment of the present disclosure.
Figure 5:
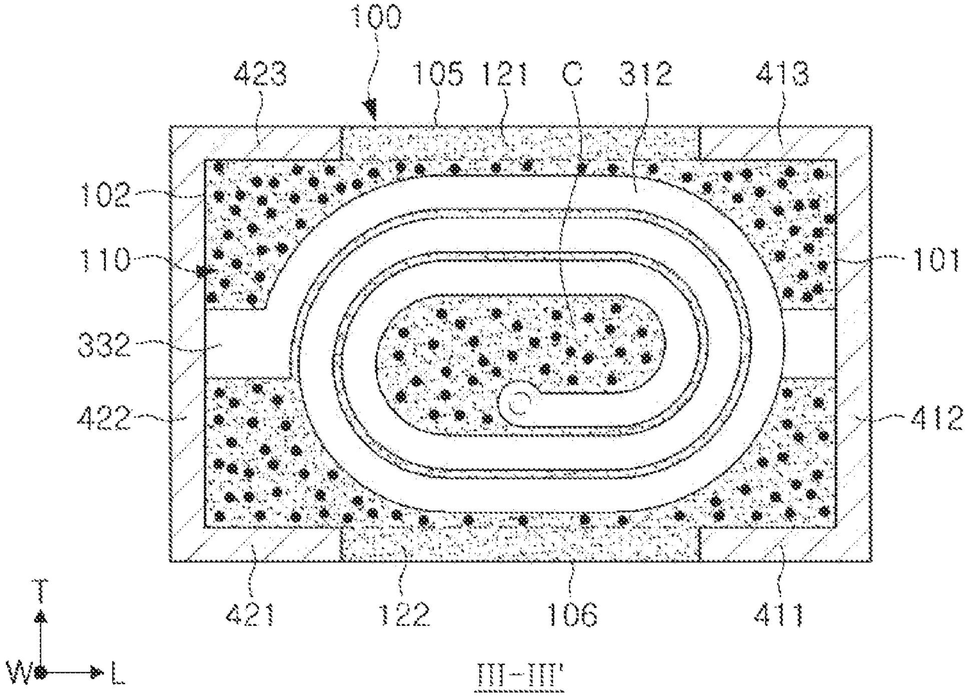
FIG. 5 is a cross-sectional view taken along line III-III' of FIG. 4.
Figure 6:
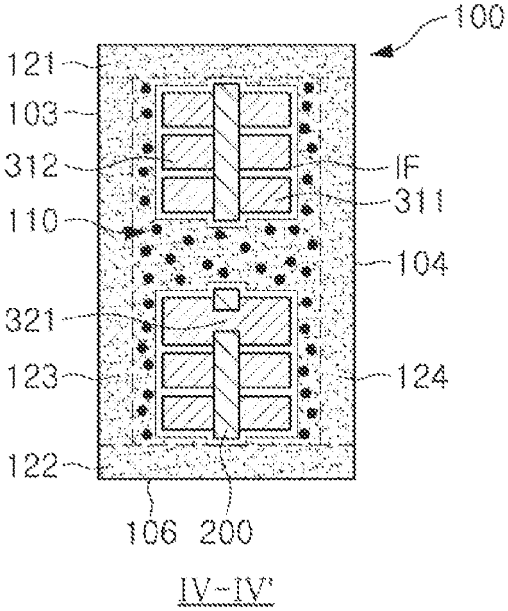
FIG. 6 is a cross-sectional view taken along line IV-IV' of FIG. 4.

FIG. 4 is a schematic perspective view of another coil component according to an exemplary embodiment. FIG. 5 is a cross-sectional view taken along line of FIG. 4, and FIG. 6 is a cross-sectional view taken along line IV-IV' of FIG. 4. For ease of description, in FIG. 5, an internal structure of the coil component is illustrated based on the cross-section taken along line III-III' of FIG. 4.

Referring to FIGS. 1 to 3 and FIGS. 4 to 6, a difference between a coil component 2000 according to the present embodiment and the coil component 1000 according to an exemplary embodiment exists in first and second cover portions 121 and 122 and external electrodes 410 and 420. Therefore, the present embodiment will be described while focusing on only the first and second cover portions 121 and 122 and the external electrodes 410 and 420. The descriptions of the exemplary embodiment may be equivalently applied to the other components of the present embodiment.

Referring to FIGS. 4 to 6, a first cover portion 121 and a second cover portion 122, applied to the coil component 2000 according to the present embodiment, may be disposed on only a portion of each of an upper surface and a lower surface of an active portion in a length direction L. Specifically, the first cover portion 121 extends continuously between edges of an upper surface of the active portion 110 in a width direction W, but does not cover both end portions of the upper surface of the active portion 110 in the length direction because the first cover portion 121 is disposed in only a central portion of the upper surface of the active portion 110 in the length direction. The second cover portion 122 extends continuously between edges of a lower surface of the active portion 110 in the width direction, but does not cover both end portions of the lower surface of the active portion 110 in the length direction because the second cover portion 122 is disposed in only a central portion of the lower surface of the active portion 110 in the length direction. As a result, each of the pad portions 411 and 421 and the band portions 412 and 422 of the external electrodes 410 and 420 is in contact with the lower and upper surfaces of the active portion 110. For example, the first cover portion 121 may cover only a space, in which the pad portions 411 and 421 are spaced apart from each other, of the lower surface of the active portion 110, and the second cover portion 122 may cover a space, in which the pad portions 411 and 421 are spaced apart from each other, of the lower surface of the active portion 110. In the present embodiment, since the first and second cover portions 121 and 122 are disposed in only some regions of the upper and lower surfaces of the active portion 110, an entire thickness of the component may be reduced. In addition, since the first and second cover portions 121 and 122 are disposed in the space in which the band portions 413 and 423 are spaced apart from each other and the space in which the pad portions 411 and 421 are spaced apart from each other, short-circuits between the electrodes 410 and 420 may be prevented when the external electrodes 410 and 420 are formed through a plating process.

Figure 7:
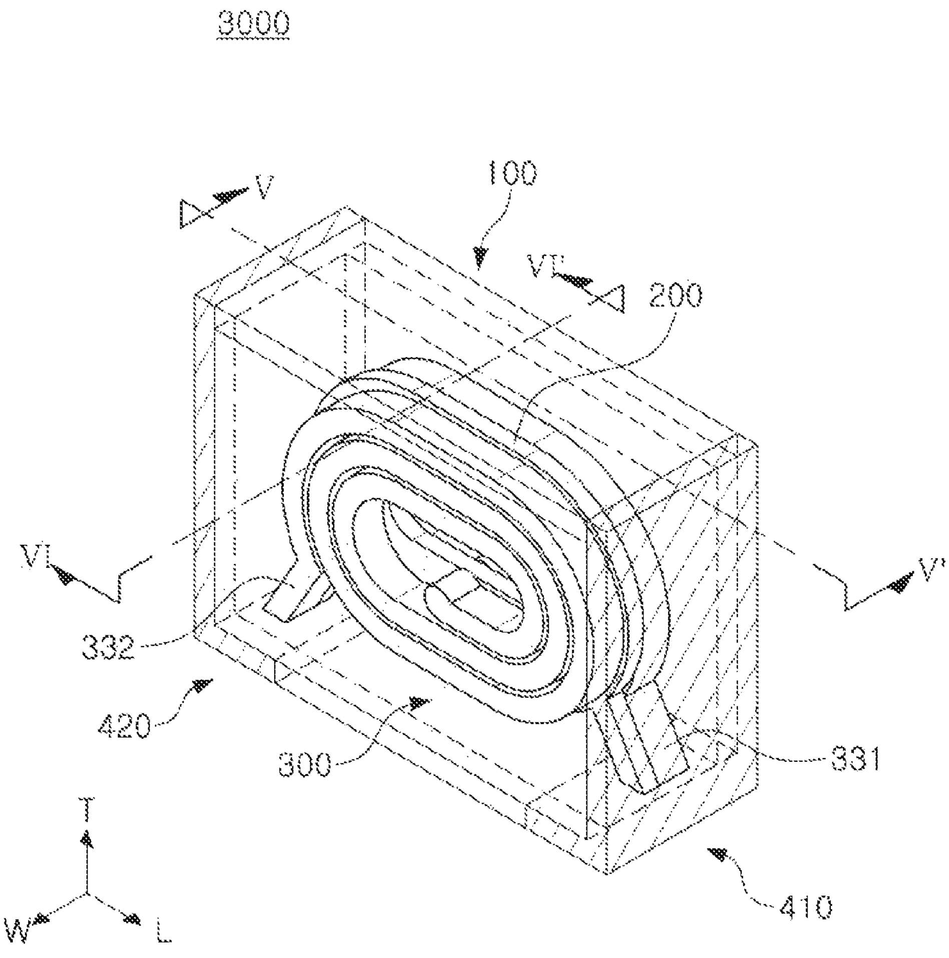
FIG. 7 is a schematic perspective view of another coil component according to an exemplary embodiment of the present disclosure.
Figure 8:
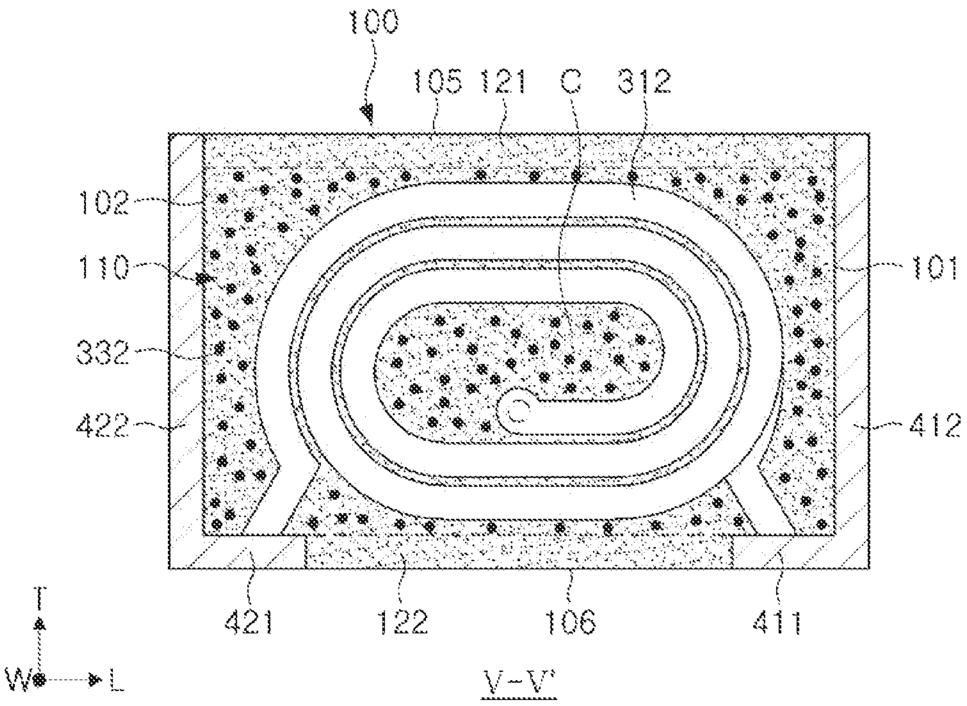
FIG. 8 is a cross-sectional view taken along line V-V' of FIG. 7.
Figure 9:
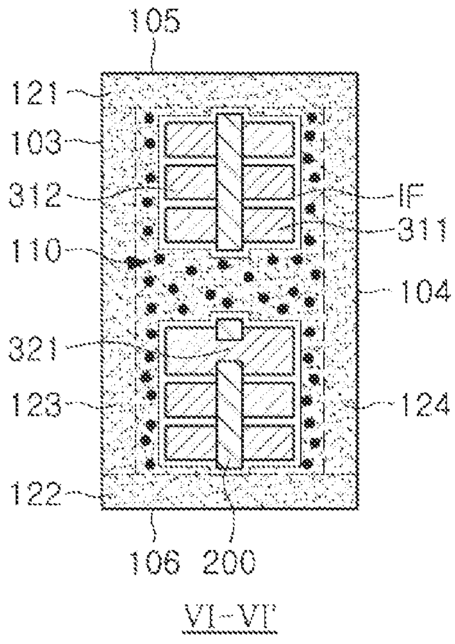
FIG. 9 is a cross-sectional view taken along line VI-VI' of FIG. 7.

FIG. 7 is a schematic perspective view of another coil component according to an exemplary embodiment. FIG. 8 is a cross-sectional view taken along line V-V' of FIG. 7, and FIG. 9 is a cross-sectional view taken along line VI-VI' of FIG. 7. For ease of description, in FIG. 8, an internal structure of the coil component is illustrated based on the cross-section taken along line V-V' of FIG. 7.

Referring to FIGS. 1 to 3 and FIGS. 7 to 9, a difference between a coil component 3000 according to the present embodiment and the coil component 1000 according to an exemplary embodiment exists in lead-out patterns 331 and 332. Therefore, the present embodiment will be described while focusing on only the lead-out patterns 331 and 332. The descriptions of the exemplary embodiment may be equivalent.

Referring to FIGS. 7 to 9, in a coil portion 300 applied to the coil component 3000 according to the present embodiment, the lead-out patterns 331 and 332 may be exposed to a lower surface of the active portion 110. Specifically, the first lead-out pattern 331 and the second lead-out pattern 332 may be exposed to the lower surface of the active portion 110 in such a manner that they are spaced apart from each other, but may not be exposed to the other surfaces of the body 100. Thus, the coil component 3000 according to the present embodiment may easily implement a lower electrode structure of a component.

In the present embodiment, external electrodes 410 and 420 are formed to have, for example, an overall L shape, as illustrated in FIGS. 7 to 9. Specifically, the first external electrode 410 may include a first pad portion 411, disposed on the lower surface of the active portion 110, and a first extension portion 412 extending from a first pad portion 411 to the first surface of the body 100. The second external electrode 420 may include a first pad portion 411, disposed on the lower surface of the active portion 110, and a first extension portion extending from the first pad portion 411 to the first surface of the body 100. However, since the shapes of the external electrodes 410 and 420 illustrated in FIGS. 7 to 9 are only exemplary, the present embodiment is not limited thereto.

As described above, a coil component, in which a coil portion is disposed to be perpendicular to a lower surface of a body, may readily prevent short-circuits between external electrodes.

In addition, a coil component, in which a coil portion is disposed to be perpendicular to a lower surface of a body, may increase an effective volume of a magnetic material.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having an upper surface and a lower surface opposing each other in a thickness direction of the body;

a support substrate disposed in the body and having one surface perpendicular to the lower surface of the body;

a coil portion disposed on at least one surface of the support substrate; and a first external electrode and a second external electrode disposed on the lower surface of the body to be spaced apart from each other and respectively connected to the coil portion, wherein the body includes an active portion, covering the coil portion, and first and second cover portions, respectively disposed on an upper surface and a lower surface of the active portion opposing each other in the thickness direction, the active portion includes a first magnetic metal particle, a second magnetic metal particle having a smaller diameter than the first magnetic metal particle, and a first insulating resin, and each of the first and second cover portions includes a third magnetic metal particle, having a smaller diameter than the first magnetic metal particle, and a second insulating resin.

2. The coil component of claim 1, wherein at least a portion of the first magnetic metal particle is cut to be exposed to one of the upper and lower surfaces of the active portion.

3. The coil component of claim 1, wherein the second magnetic metal particle and the third magnetic metal particle have the same diameter.

4. The coil component of claim 1, wherein the body further includes a third cover portion and a fourth cover portion, respectively disposed on both side surfaces of the active portion opposing each other in a width direction of the body, and each of the third cover portion and the fourth cover portion includes a fourth magnetic metal particle, having a smaller diameter than the first magnetic metal particle, and a third insulating resin.

5. The coil component of claim 4, wherein the fourth magnetic metal particle and the third magnetic metal particle have the same diameter.

6. The coil component of claim 4, wherein the first and second cover portions respectively extend from the upper surface and the lower surface of the active portion to cover at least a portion of each of an upper surface and a lower surface of each of the third and fourth cover portions.

7. The coil component of claim 6, wherein the upper surface of the active portion and the upper portion of each of the third and fourth cover portions are coplanar with each other.

8. The coil component of claim 6, wherein the body further has one end surface and the other end surface opposing each other in a length direction of the body, the first and second external electrodes respectively includes pad portions, disposed on the lower surface of the active portion to be spaced apart from each other, and extension portions extending to the one end surface and the other end surface of the body, each of the pad portions is in contact with the lower surface of the active portion, the second cover portion is disposed in a separation space between the pad portions of the lower surface of the active portion, the first cover portion covers an entire upper surface of the active portion, and each of the extension portions is in contact with a side surface of the first cover portion and does not extend upwardly of the upper surface of the first cover portion.

9. The coil component of claim 1, wherein the body further has one end surface and the other end surface opposing each other in a length direction of the body, and the first and second external electrodes respectively include pad portions disposed on the lower surface of the active portion to be spaced apart from each other, extension portions extending from the pad portions to the one end surface and the other end surface of the body, and band portions disposed on the upper surface of the active portion to be spaced apart from each other.

10. The coil component of claim 9, wherein the first and second cover portions cover entire upper and lower surfaces of the active portion, respectively, and the band portions and the pad portions are disposed on the first and second cover portions, respectively.

11. The coil component of claim 9, wherein each of the band portions and the pad portions is in contact with the upper surface or the lower surface of the active portion, and the first cover portion is disposed in a separation space between the band portions of the upper portion of the active portion, and the second cover portion is disposed in a separation space between the pad portions of the lower surface of the active portion.

12. A coil component comprising:

a body having a lower surface;

a support substrate disposed in the body and having one surface perpendicular to the lower surface of the body; and a coil portion dispose on at least one surface of the support substrate, wherein the body includes an active portion, covering the coil portion, and first to fourth cover portions, respectively disposed on an upper surface of the body, the lower surface of the body, one side surface of the body, and the other side surface of the body, each of the active portion and the first to fourth cover portions includes magnetic metal particles and an insulating resin, and a filling rate of the magnetic metal particles of the active portion is greater than a filling rate of the magnetic metal particles of each of the first to fourth cover portions.

13. The coil portion of claim 12, wherein the first cover portion has a boundary with the upper surface of the active portion, and the second cover portion has a boundary with the lower surface of the active portion, and at least a portion of the magnetic metal particle is cut to be exposed to the boundary.

14. A coil component comprising:

a body having an upper surface and a lower surface opposing each other;

a coil portion disposed in the body vertically with respect to the lower surface of the body; and a first external electrode and a second external electrode respectively including pad portions disposed on the lower surface of the body to be spaced apart from each other and connected to the coil portion, wherein an average size of metal particles dispersed in a portion, in contact with one of the pad portions, of the body, is less than an average size of metal particles dispersed in another portion, spaced apart from outer surfaces of the body, of the body.

15. The coil component of claim 14, wherein a metal particle in the another portion of the body include a flat surface and a curved surface intersected by the flat surface.

16. The coil component of claim 14, wherein the body further has one end surface and the other end surface opposing each other, and the first and second external electrodes respectively further include extension portions extending from the pad portions to the one end surface and the other end surface of the body, and band portions disposed on the upper surface of the active portion to be spaced apart from each other.

17. The coil component of claim 16, wherein an average size of metal particles dispersed in a portion, in contact with one of the band portions, of the body, is less than the average size of metal particles dispersed in the another portion, spaced apart from the outer surfaces of the body, of the body.

18. The coil component of claim 14, wherein the body further has one end surface and the other end surface opposing each other, and the first and second external electrodes respectively further includes extension portions extending to the one end surface and the other end surface of the body.

19. The coil component of claim 18, wherein an average size of metal particles dispersed in a portion, in contact with one of the extension portions, of the body, is less than the average size of metal particles dispersed in the another portion, spaced apart from the outer surfaces of the body, of the body.

20. The coil component of claim 14, wherein a metal particle in the body including a flat surface and a curved surface intersected by the flat surface is spaced apart from the outer surfaces of the body.

21. The coil component of claim 14, wherein a winding axis of the coil portion is parallel to the lower surface.

* * * * *